July 21, 1953 W. E. WHITNEY 2,646,077
MULTILAYER DIAPHRAGM
Filed Feb. 15, 1950
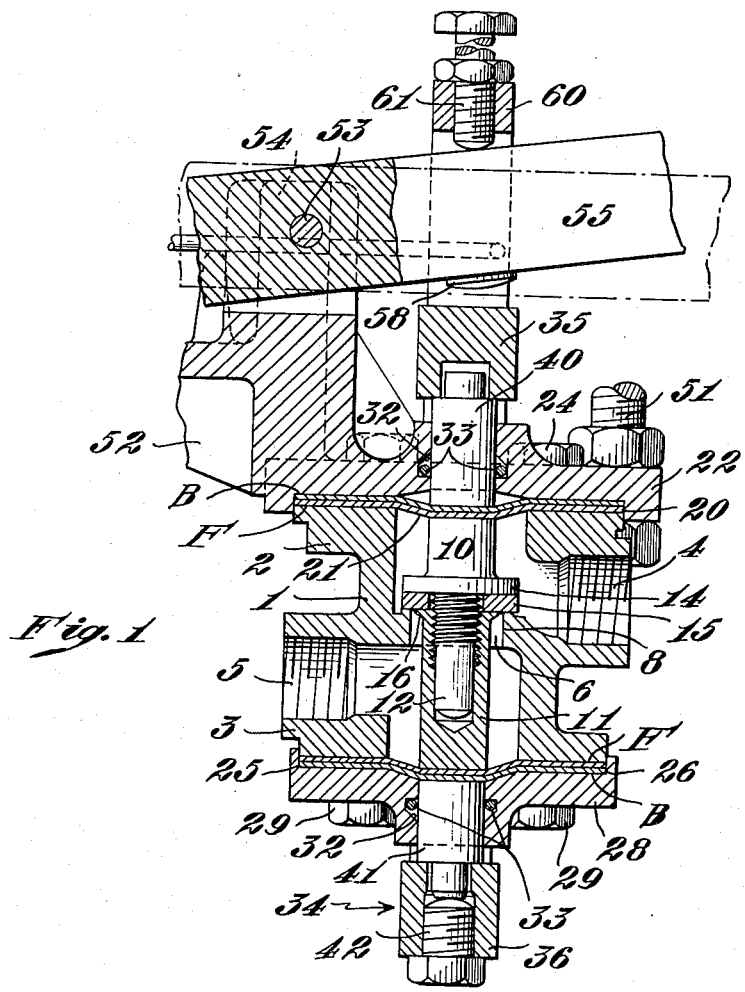
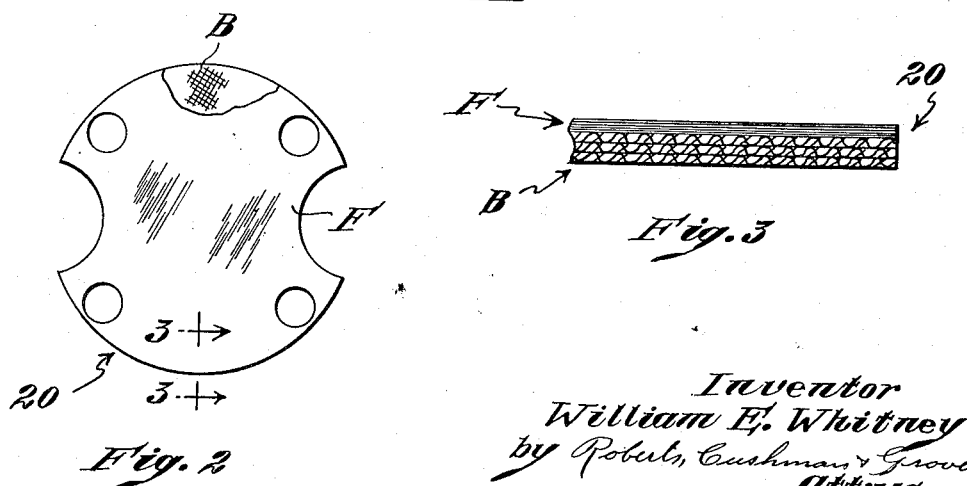
Inventor
William E. Whitney
by Pobuls, Cushman & Grover
Att'ys Patented July 21, 1953

2,646,077

UNITED STATES PATENT OFFICE 2,646,077

MULTILAYER DIAPHRAGM

William E. Whitney, Belmont, Mass., assignor, by mesne assignments, to Stator Company, a corporation of Massachusetts Application February 15, 1950, Serial No. 144,261

9 Claims. (Cl. 137—791)

This invention relates to diaphragms for valves, pumps and the like applications where relatively high pressures are involved.

A satisfactory diaphragm for such applications must not only have high tensile, bursting and flexural strength and a long flex-life, but also must provide an impervious fluid-tight seal which is inert to fluids with which it may come in contact and highly resistant to cold flow or deformation. Although various types of laminated materials have been suggested, as far as I am aware no one has heretofore produced a satisfactory diaphragm capable of operating in the herein described type of valve and withstanding some 10,000 to 100,000 flexures under pressures of 300 p. s. i., or more, and otherwise meet the aforementioned requirements.

The principal object of the present invention is to provide a relatively inexpensive diaphragm which meets the aforementioned requirements.

A more specific object is to provide a diaphragm which can be used in valves of the type shown in my copending application, Serial No. 751,062, filed May 28, 1947, and which is resistant to liquid propane and the like hydrocarbons under relatively high pressures.

Further objects will be apparent from a consideration of the following description and accompanying drawings, wherein:

Fig. 1 is a vertical section through a valve having diaphragms made in accordance with the present invention;

Fig. 2 is a top plan view of one of the diaphragms; and

Fig. 3 is an enlarged section on the line 3—3 of Fig. 2.

In accordance with the present invention I provide a pressure-proof diaphragm comprising a facing which consists essentially of a plurality of superposed, imperforate, unbonded sheets or films of a vinylidene chloride-vinyl chloride copolymer, sold under the trade designations Saran and Velon, or the like material having substantially the same physical properties, and a backing which consists essentially of a plurality of superposed, unbonded layers of woven fabric composed of strands of thermoplastic filaments selected from the group consisting of fine glass fibers (Fiberglas), vinylidene chloride-vinyl chloride fibers (Saran and Velon), and fibers produced from a long-chain synthetic polyamide having recurring amide groups as an integral part of the main polymer chain (nylon).

The number and thickness of the facing sheets or films to be used in preparing the facing will depend on the pressures to which the diaphragm is to be subjected and as a general rule they are inversely related, i. e., a greater number of thin sheets may be used in place of a lesser number of thicker sheets. As a practical matter the number of sheets or films may vary from a minimum of 2 to a maximum which may run as high as 200. The same is true with respect to the backing except that a lesser number of layers is usually required than for the facing, a practical working range being from 2 to 10 or more unbonded layers. For example, for pressures between 100 and 500 p. s. i., a facing consisting of 20 to 50 superposed films of vinylidene chloride-vinyl chloride copolymer (Saran) having a thickness of about 0.001" to 0.0005", and a backing consisting of 2 to 5 layers of a woven fabric having a thickness of about 0.03" to 0.01" and composed either of the aforementioned polymeric amide (nylon), glass fibers (Fiberglas), or vinylidene chloride-vinyl chloride copolymer (Saran), produce a satisfactory diaphragm.

As a general rule a facing having a greater number of thinner sheets is preferable to one having a lesser number of thicker sheets since the life of the diaphragm, measured in terms of operating cycles, increases proportionately with the number of sheets or films for a given total thickness, as shown by the following table of comparative tests:

Facing

| Thickness of Each Sheet, inches | Number of sheets | Operating Cycles |
|---|---|---|
| 0.0625 | 1 | less than 100. |
| 0.002 | 10 | 12,000. |
| 0.001 | 20 | 21,000. |
| 0.0005 | 40 | 36,000. |

Each operating cycle consists of an opening and closing movement of a valve containing oil at a pressure of about 350 lbs. per square inch, the temperature of which is periodically varied so as to subject the diaphragm to a temperature range between approximately 0° F. and room temperature. The test machine operated at 2500 cycles per hour and the temperature-cycle consisted of alternate four-hour periods at the above temperatures. The test samples consisted of the specified number of facing sheets backed up by three layers of nylon fabric, each layer having a thickness of 0.018".

In any case the diaphragm is applied so that the facing provides the surface to be exposed to the fluid passing through the valve or pump, as the case may be, and the woven fabric backing provides, in effect, a highly flexible reinforcement preventing objectionable deformation of the facing, without which satisfactory results could not be obtained.

Referring to the accompanying drawings which illustrate a particularly advantageous application of the invention to a valve of the aforementioned type, the numeral 1 designates a generally cylindrical valve casing having flanged opposite ends 2 and 3, and inlet and outlet ports 4 and 5 between which is a valve opening 6 and a seat 8 dividing the interior of the valve casing into an upper compartment communicating with the inlet 4 and a lower compartment communicating with the outlet 5.

A valve stem is axially mounted within the casing 1 and this valve stem comprises an upper section 10 and a lower section 11 interconnected by a threaded stud 12 integral with the inner end of the section 10. The lower end of the upper section 10 is enlarged so as to provide an annular shoulder 14 against which a washer or the like annular member 15 is seated, being retained in position by a flange 16 integral with the inner end of the lower section 11.

The over-all length of the valve stem may be approximately the same as the length of the casing 1 so that when the valve head closes the opening 6 the lower end of the stem projects beyond the outer face of the flange 3 and the upper end of the stem is disposed inwardly of the outer face of the flange 2, and when the valve is open the relative position of these parts is reversed.

A flexible diaphragm 20 is secured to the outer face of the flange 2 by a closure plate or the like member 22 which is rigidly held in position by screws 24. In like manner a flexible diaphragm 25 is secured to the outer face of the flange 3 by a closure plate 28 which is rigidly held in position by screws 29. Both the closure plates 22 and 28 are formed with central openings aligned with the valve stem.

Each of the diaphragms 20 and 25, as shown in Figs. 2 and 3, comprises a facing F consisting of forty superposed sheets of vinylidene chloride-vinyl chloride copolymer (Saran—Type M), each sheet having a thickness of about 0.0005", and a backing B of three superposed layers of woven strands composed of the aforementioned polymeric amide (nylon), each layer having a thickness of about 0.018". The chosen number of films are superposed on each other and the facing elements are blanked out or otherwise prepared so as to fit the particular application. The backing layers are individually blanked out or otherwise prepared and the chosen number are then superposed on each other for assembly with the facing elements. The assembled sheets thus provide the diaphragm which, as here shown, is inserted between the opposite ends 2 and 3 of the valve casing 1 and the closure plates 22 and 28 so that their vinylidene chloride-vinyl chloride copolymer facings F are exposed to the interior of the valve where they will come in contact with the fluid passing therethrough.

Both the closure plates 22 and 28 are formed with annular recesses 32 surrounding the central openings therein and each of these recesses is preferably of trapezoidal or triangular cross-section so as to provide an upwardly and inwardly inclined tapered wall. Within these recesses and surrounding the associated operating pin is an annulus or toroid 33 of rubber or rubber-like material. The action of this annulus permits air to flow back and forth into the chambers above and below the diaphragms so long as they are intact, but if a diaphragm should rupture, the outwardly rushing liquid or gas from the valve chamber will force the annulus 33 into the tapered part of the recess and thus seal the operating pins to the closure plates 22 and 28, thereby preventing the escape of liquid or gas.

A rectangular operating yoke 34 embraces the casing 1 and is slidably mounted on its exterior, the yoke comprising top and bottom cross bars 35 and 36 rigidly connected with longitudinal rods which pass through clearance slots formed on the exterior wall of the casing as shown in the aforesaid copending application. The upper cross bar 35 is formed with a central opening which receives the reduced end of an inwardly extending operating pin or finger 40 projecting through the opening in the plate 22 so as to engage the outer face or backing B of the diaphragm 20. In a similar manner the bottom cross bar 36 is formed with a central opening for receiving the reduced end of operating pin or finger 41 which is engageable with the outer face or backing B of the diaphragm 25.

A set screw 42 is threaded through the central opening of the cross bar 36 and engages the outer end of the finger 41 so as to effect relative adjustment between the parts. When the set screw 42 is properly adjusted, the operating finger 40 engages the backing of the diaphragm 20 and the inner end of the finger 41 engages the backing of the diaphragm 25. Hence, movement of the operating yoke relative to the casing 1 causes the operating fingers 40, 41 to act through the diaphragms 20, 25 on the valve stem so as to open and close the valve head 14, 15.

As here shown the effective areas of both diaphragms 20 and 25 are such that when the pressure in the inlet chamber or compartment is greater than that in the outlet chamber, the valve automatically opens unless the movement of the yoke is restrained. If the pressure in both the inlet and outlet compartments is substantially the same, the weight of the yoke tends to close the valve although, if desired, means may be provided for opposing closing movement of the valve. When the valve is open, the pressure in the interior of the valve casing acts on both diaphragms 20 and 25 and hence the force on the diaphragm 20 tending to open the valve is balanced by that on the diaphragm 25 which tends to close the valve. In operation the valve is balanced so that a relatively light pressure on the operating yoke is effective to close the valve.

Although any suitable means may be provided to actuate the yoke 34, the particular mechanism herein shown is designed for operation by the beam of a weighing scale. Accordingly, the closure plate 22 is formed with radially extending lugs which are connected with the lower end of supporting rods 51 by means of which the valve may be supported in fixed position. The plate 22 is also formed with a laterally extending bracket 52 having upstanding lugs 54 carrying a pin 53 which pivotally supports an operating lever 55. The under side of the lever 55 is provided with a knob 58 engageable with the top cross bar 35, and a yoke 60, mounted on the cross bar 35, straddles a lever 55 so as to limit its movement relative to the operating yoke 34. A set screw 61, carried by the yoke 60 and engageable with the upper edge of the lever 55, limits the free swinging movement of the lever.

It will be observed that when the lever 55 is swung to an inclined position, as shown by the full lines in Fig. 1 to open the valve, the pressure of the fluid in the inlet chamber acting on the diaphragm 20 aids in opening the valve. When the lever 55 swings downwardly to horizontal position, as shown by the dot and dash lines of Fig. 1, engagement of the knob 58 with the bar 35 causes the valve to close. Although in the embodiment herein shown, the pressure of the fluid in the inlet chamber tends to open the valve, the weight of the lever 55 is such as to overcome this tendency with an adequate margin of safety.

While I have shown and described one desirable embodiment of my invention, it should be understood that the present disclosure is for the purpose of illustration only and that this invention includes all modifications and equivalents which fall within the scope of the appended claims.

The present application is a continuation-in-part of my copending application Serial No. 4,676, filed January 27, 1948, now abandoned.

I claim:

1. In a valve of the type having a casing formed with an opening to accommodate a valve actuating means and annular clamping means surrounding said opening, a pressure-proof diaphragm closing said opening, said pressure-proof diaphragm comprising a facing which consists essentially of a plurality of superposed, unbonded, imperforate sheets each having a thickness between approximately 0.001" and 0.0005" and composed of a vinylidene chloride-vinyl chloride copolymer, and a backing consisting essentially of a plurality of unbonded sheets of a woven fabric each having a thickness between approximately 0.01" and 0.03" and composed of strands of thermoplastic filaments selected from the group consisting of fine glass fibers, vinylidene chloride-vinyl chloride copolymer fibers, and fibers produced from a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

2. In a valve of the type having a casing formed with an opening to accommodate a valve actuating means and annular clamping means surrounding said opening, a pressure-proof diaphragm closing said opening, said pressure-proof diaphragm comprising a facing which consists essentially of from 2 to 200 superposed, unbonded, imperforate sheets each having a thickness between approximately 0.001" and 0.0005" and composed of a vinylidene chloride-vinyl chloride copolymer, and a backing which consists essentially of from 2 to 10 unbonded sheets of a woven fabric each having a thickness between approximately 0.01" and 0.03" and composed of strands of a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

3. In a valve of the type having a casing formed with an opening to accommodate a valve actuating means and annular clamping means surrounding said opening, a pressure-proof diaphragm closing said opening, said pressure-proof diaphragm comprising a facing which consists essentially of from 20 to 50 superposed, unbonded, imperforate films each having a thickness between approximately 0.001" and 0.0005" and composed of a vinylidene chloride-vinyl chloride copolymer, and a backing which consists essentially of from 2 to 5 unbonded layers of a woven fabric each having a thickness between approximately 0.01" and 0.03" and composed of strands of thermoplastic filaments selected from the group consisting of fine glass fibers, vinylidene chloride-vinyl chloride copolymer fibers, and fibers produced from a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

4. In a valve of the type having a casing formed with an opening to accommodate a valve actuating means and annular clamping means surrounding said opening, a pressure-proof diaphragm closing said opening, said pressure-proof diaphragm comprising a facing which consists essentially of from 20 to 50 superposed, unbonded, imperforate films each having a thickness between approximately 0.001" and 0.0005" and composed of vinylidene chloride-vinyl chloride copolymer and a backing which consists essentially of from 2 to 5 unbonded layers of a woven fabric each having a thickness between approximately 0.01" and 0.03" and composed of strands of a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

5. In a valve of the type having a casing formed with an opening to accommodate a valve actuating means and annular clamping means surrounding said opening, a diaphragm closing said opening, said diaphragm being capable of withstanding pressures exceeding 300 pounds per square inch and resistant to hydrocarbons and comprising a facing which consists essentially of a plurality of superposed, unbonded, imperforate films of a vinylidene chloride-vinyl chloride copolymer having a total thickness of the order of 0.02 inch, and a backing which consists essentially of a plurality of unbonded layers of a woven fabric having a total thickness of the order of 0.05 inch, the individual layers of fabric being unbonded and each being composed of strands of thermoplastic filaments selected from the group consisting of fine glass fibers, vinylidene chloride-vinyl chloride copolymer fibers, and fibers produced from a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

6. In a valve of the type having a casing formed with an opening to accommodate a valve actuating means and annular clamping means surrounding said opening, a diaphragm closing said opening, said diaphragm being capable of withstanding pressures exceeding 300 pounds per square inch and resistant to hydrocarbons and comprising a facing which consists essentially of from 20 to 50 superposed, unbonded, imperforate films of a vinylidene chloride-vinyl chloride copolymer having a total thickness of the order of 0.02 inch, and a backing which consists essentially of from 2 to 5 unbonded layers of a woven fabric having a total thickness of the order of 0.05 inch, the individual layers of fabric each being composed of strands of a long-chain synthetic polymeric amide having recurring amide groups as an integral part of the main polymer chain, the facing and backing sheets being secured together in fluid tight relation at their peripheries by said annular clamping means with the innermost facing sheet exposed to the interior of said casing.

7. In a valve of the type having a casing formed with an opening to accommodate a valve actuating means and annular clamping means surrounding said opening, a diaphragm closing said opening, said diaphragm being capable of withstanding pressures exceeding 300 pounds per square inch and resistant to hydrocarbons and comprising a facing composed of approximately 40 superposed, unbonded, imperforate films of vinylidene chloride-vinyl chloride copolymer having a total thickness of the order of 0.02 inch, and a backing consisting of approximately three unbonded layers of a woven fabric having a total thickness of the order of 0.05 inch, the fabric consisting of strands composed of a long-chain polymeric amide having recurring amide groups as an integral part of the main polymer chain, the facing and backing sheets being secured together in fluid tight relation at their peripheries by said annular clamping means with the innermost facing sheet exposed to the interior of said casing.

8. A device of the character described comprising a casing defining a chamber having an inlet and an outlet and means associated with the casing defining an annular seat, a flexible diaphragm having its peripheral portion secured in fluid tight relation to said seat, said diaphragm comprising a facing which consists essentially of a plurality of superposed, unbonded, imperforate sheets each having a thickness between approximately 0.001" and 0.0005" and composed of a vinylidene chloride-vinyl chloride copolymer and a backing which faces outwardly away from said seat, said backing consisting essentially of a plurality of unbonded sheets of a woven fabric each having a thickness between approximately 0.01" and 0.03" and composed of strands of thermoplastic filaments selected from the group consisting of fine glass fibers, vinylidene chloride-vinyl chloride copolymer fibers, and fibers produced from a long-chain synthetic polymeric amide having recurring amide groups as an integral part of the main polymer chain, and means slidably supported by said casing for flexing the central portion of said diaphragm.

9. A device of the character described comprising a casing defining a chamber having an inlet and an outlet, means associated with the casing defining an annular seat, a flexible diaphragm having its peripheral portion secured in fluid tight relation to said seat, said diaphragm comprising a facing which consists essentially of from 20 to 50 superposed, unbonded, imperforate films each having a thickness between approximately 0.001" and 0.0005" and composed of vinylidene chloride-vinyl chloride copolymer, and a backing which faces outwardly away from said seat, said backing consisting essentially of from 2 to 5 unbonded layers of a woven fabric each having a thickness between approximately 0.01" and 0.03" and composed of strands of a long-chain synthetic polymeric amide having recurring amide groups as an integral part of the main polymer chain, and means slidably supported by said casing for flexing the central portion of said diaphragm.

WILLIAM E. WHITNEY.

References Cited in the file of this patent

UNITED STATES PATENTS

| Number | Name | Date |
|---|---|---|
| 1,802,136 | Carter | Apr. 21, 1931 |
| 2,281,635 | Strauss | May 5, 1942 |
| 2,381,061 | Kallmann | Aug. 7, 1945 |
| 2,405,038 | Jennings | July 30, 1946 |